United States Patent [19]
Catotti et al.

[11] Patent Number: 5,141,523
[45] Date of Patent: Aug. 25, 1992

[54] RECHARGEABLE NICKEL ELECTRODE CONTAINING ELECTROCHEMICAL CELL AND METHOD

[75] Inventors: Arthur J. Catotti; Saverio F. Pensabene; Douglas B. Frye; Vincent J. Puglisi, all of Gainesville, Fla.

[73] Assignee: Gates Energy Products, Inc., Gainesville, Fla.

[21] Appl. No.: 719,459

[22] Filed: Jun. 24, 1991

Related U.S. Application Data

[60] Division of Ser. No. 529,084, May 25, 1990, Pat. No. 5,106,707, and a continuation-in-part of Ser. No. 383,376, Jul. 20, 1989, Pat. No. 4,929,519.

[51] Int. Cl.⁵ .................................... H01M 4/20
[52] U.S. Cl. .................................... 29/623.5; 141/1.1
[58] Field of Search .............. 29/623.5, 623.1, 2; 141/1.1, 32, 33; 72/46

[56] References Cited

U.S. PATENT DOCUMENTS

| | | | |
|---|---|---|---|
| 4,050,482 | 9/1977 | Ching et al. | 29/623.5 X |
| 4,245,584 | 1/1981 | Kolosov et al. | 141/1.1 X |
| 4,582,098 | 4/1986 | Matsumoto et al. | 141/1.1 |

*Primary Examiner*—Anthony Skapars
*Attorney, Agent, or Firm*—C. H. Castleman, Jr.; J. L. Isaac; H. W. Oberg

[57] ABSTRACT

A sealed rechargeable nickel electrode containing electrochemical cell has a pasted negative electrode having paste layers adhered to a nonforaminous conductive substrate, which retards growth (swelling) of the nickel electrode on cycling.

3 Claims, 4 Drawing Sheets

RECHARGEABLE NICKEL ELECTRODE CONTAINING ELECTROCHEMICAL CELL AND METHOD

This is a continuation-in-part of copending application Ser. No. 383,376 filed Jul. 20, 1989, now U.S. Pat. No. 4,929,519.

BACKGROUND OF THE INVENTION

The present invention relates to an electrode assembly for a rechargeable electrochemical cell having a nickel positive electrode subject to swelling on recharging, and a pasted negative electrode, and in one aspect to an electrode assembly of the foregoing type wherein a portion of an exterior face of a substrate of that portion of an electrode plate defining the outermost or peripheral layer or wrap of the electrode assembly is substantially exposed and contacts at least a portion of a container as assembled in a sealed electrochemical cell.

Conventionally, electrode assemblies for electrochemical cells are formed from two separate electrode plates of opposite polarity with a layer of interposed separator material. The negative electrode plate can be of a pressed or pasted design. An aqueous mixture of an electrochemically active material and a binder may be applied to each face of an electrically conductive, perforated substrate and pressed on to the substrate, for example by passing the substrate between rollers. The substrate can be stippled to improve adhesion between the substrate and the electrochemically active material.

The positive nickel electrode may be of a sintered design. A perforated or wire mesh nickel or nickel-plated steel substrate of, for example, 2-3 mils thickness, is sintered with a carbonyl nickel powder layer or layers to form a porous electrode plaque of, for example, 20-30 mils thickness. The resultant porous plaque is conventionally impregnated with a solution of an electrochemically active material precursor, typically nickel nitrate. The electrochemically active nickel hydroxide material is precipitated out of solution within the plate.

In addition, an ultra high porosity nickel positive electrode plate can be utilized in which an electrochemically active nickel material may be bonded to a porous substrate such as a highly porous metal foam or fibrous mat by, for example, pressing a slurry or paste containing the active material on to and within interstices of the substrate. The substrate may then be compacted to form a positive nickel electrode plate having a desired thickness.

In sealed rechargeable nickel electrode-containing cells, such as commercial sealed nickel-cadmium cells employing sintered nickel electrodes, the nickel electrode increases in thickness during cycling. Thickening is believed to be related to the ratio of gamma nickel hydroxide present to beta III nickel hydroxide, the gamma form occupying more space. Such swelling tends to significantly shorten cell life, oftentimes because of premature shorting of the electrode plates. Various efforts have been made in the past to eliminate or inhibit this swelling phenomenon. Only limited success has been realized.

Accordingly, it is an object of this invention to produce a rechargeable nickel electrode-containing electrochemical cell in which means are incorporated to retard the normal tendency of the nickel electrode to swell during the life of the cell.

It is a further object of the present invention to provide a wound or nonwound electrode assembly for use in a sealed nickel electrode-containing electrochemical cell having means retarding swelling of the nickel electrode and which provides for direct electrical contact between a portion of the substrate of the negative electrode plate thereof and a portion of the cell container.

Another object of the present invention is to provide a wound electrode assembly which can be easily manufactured and as assembled within a sealed nickel electrode-containing electrochemical cell will result in a substantially higher coulombic cell capacity and improved cell performance characteristics including extended life due to retardation of short circuiting.

SUMMARY OF THE INVENTION

To achieve the foregoing and other objects, and in accordance with the purposes of-the present invention, as embodied and broadly described herein, one characterization of the present invention comprises a sealed rechargeable electrochemical cell having a nickel positive electrode, a pasted negative counter electrode comprised of an electrically conductive substrate and an electrochemically active material secured to at least one face of the substrate, a separator interposed between the positive and negative electrodes, and an electrolyte. In accordance with the invention the electrically conductive substrate of the pasted negative electrode is substantially nonforaminous which, in charging of the cell, retards the normal tendency of the nickel electrode to swell.

In another aspect the foregoing sealed rechargeable electrochemical cell is housed in a multicomponent container, one component of the container serving as the negative terminal of the cell, and an end portion of the nonforaminous substrate of the negative electrode being substantially free of the electrochemically active material on a face thereof, such end portion making conductive contact with the component of the container serving as the negative cell terminal.

In yet another aspect, the invention is directed to a method for preparing a negative electrode plate for use in a rechargeable nickel electrode-containing electrochemical cell, including the steps of i) advancing an electrically conductive strip substrate at least a portion of which is nonforaminous into and through a coating means; ii) preferentially applying a paste mixture of electrochemically active material and a vehicle on to the advancing strip such that both opposed major faces of the strip bear paste along a first transverse portion of the strip, and only one of such major faces bears paste along a second transverse portion of the strip leaving a bare substrate portion; iii) transversely severing the thus pasted strip into a plurality of component strips suitable as electrodes, the base substrate portion of each component strip adapted to make electrical contact to a terminal of the electrochemical cell; and iv) removing vehicle from the component strip.

BRIEF DESCRIPTION OF THE DRAWINGS

The accompanying drawings, which are incorporated in and form part of the specification, illustrate the embodiments of the present invention and, together with the description, serve to explain the principles of the invention. In the drawings.

DETAILED DESCRIPTION OF THE PREFERRED EMBODIMENTS

The invention will be described primarily with respect to wound nickel-cadmium cells for purposes of illustration. It will be understood that the invention applies to any sealed rechargeable electrochemical cell having a nickel positive electrode, such as nickel-cadmium, nickel-zinc, nickel-hydrogen and nickel metal hydride. Any desired configuration may be employed such as spiral wound, flat wound, parallel plate (prismatic), tubular plate, button or the like.

Figure 1:
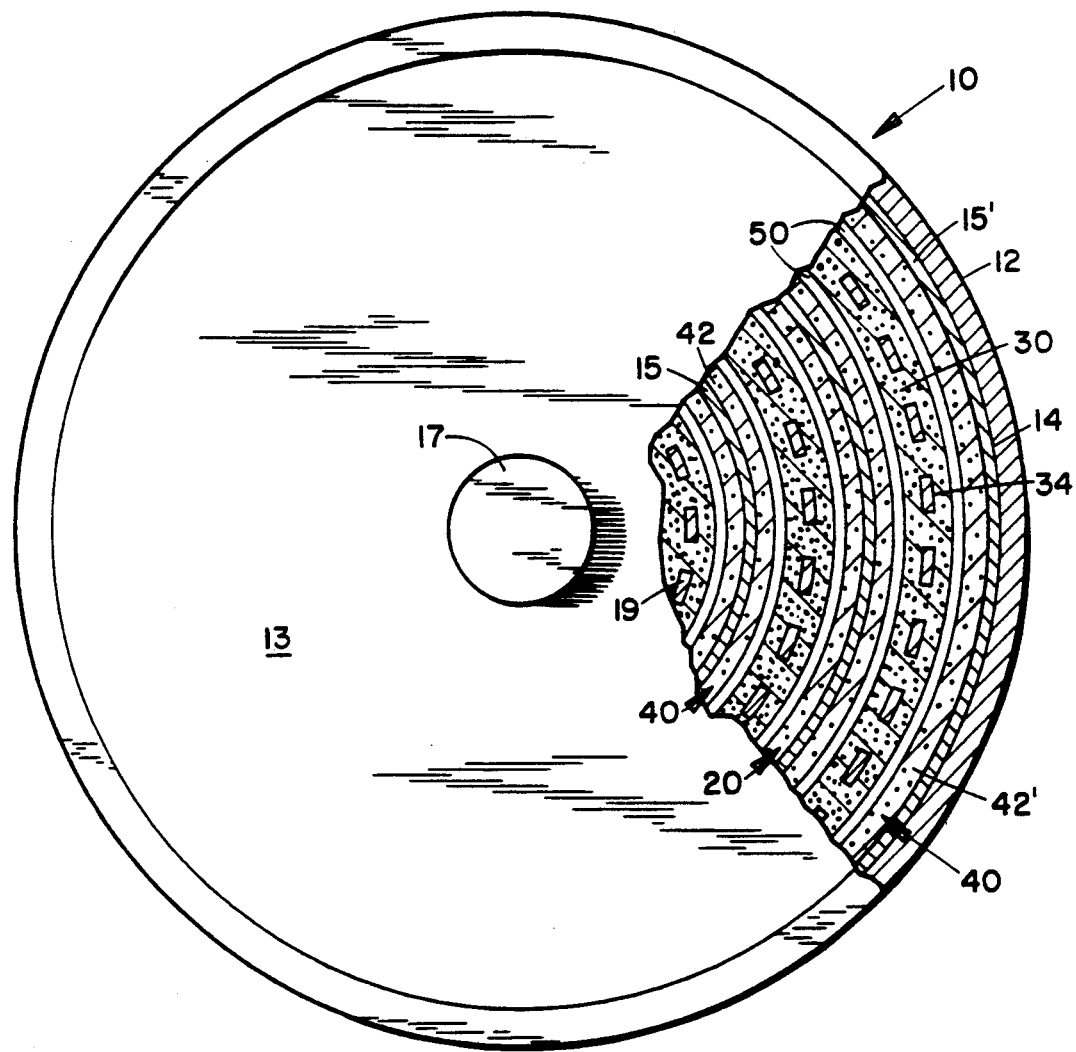
FIG. 1 is a cross-sectional view of one embodiment of a wound electrode assembly of the present invention as installed within a container of a sealed nickel electrode-containing electrochemical device.

A sealed electrochemical cell illustrated generally at 10 in FIG. 1 comprises a jar container 12 insulated from a container lid 13 housing a wound electrode assembly 20 which is dimensioned and configured to be positioned within container 12 and be contiguous with its inner sidewall 14. Container 12 may be constructed of any suitable electrically conductive material, for example nickel plated steel, having a thickness of about 0.010 to about 0.015 inches.

Electrode assembly 20 is comprised of a positive electrode plate 30 containing an electrochemically active material, notably nickel hydroxide, a negative counter electrode plate 40, and a porous, flexible interleaved separator material 50 which is positioned on each face of positive electrode 30 to electrically insulate it from negative electrode plate 40 throughout the entire cell. Any suitable separator material can be employed in the present invention, for example, unwoven nylon or polypropylene. Electrode assembly 20 is formed by winding the components thereof about a removable arbor within a nest (not illustrated) as more fully described in U.S. Pat. No. 4,203,206 which is incorporated herein by reference.

A suitable electrolyte is absorbed in the separator and plates, usually in a starved quantity, to provide interconnecting voids and a low tortuosity path to enhance diffusion of gaseous oxygen evolved at the nickel electrode on overcharge to reach the negative plate where it is consumed through a thin electrolyte layer. Alkaline electrolyte is preferred, such a 31 weight percent potassium hydroxide.

Negative electrode plate 40 is a pasted plate formed by bonding or attaching a layer of a suitable electrochemically active material 42 normally to each face or side of substrate 15. By "pasted" plate is meant a non-sintered, non-electrochemically deposited electrode formed by applying a paste, slurry, powder mixture, or the like, with or without a vehicle such as water or organic solvent, onto at least one face of substrate 15. The electrochemically active material 42 can be affixed to substrate 15 by pressing suitable paste which is a mixture primarily of active material, for instance cadmium oxide, cadmium hydroxide and cadmium metal, and binder in the case of a cadmium electrode onto substrate 15. Aqueous based binders such as ethylene vinyl acetate or dispersed polytetrafluoroethylene may be used. Alternatively, the active material may be bonded to the substrate by means of simultaneously extruding from a cross-head die an organic slurry containing the active material in suspension onto both sides of the substrate to form a layer on each face thereof. In one aspect an elastomeric binder is incorporated into the organic slurry to maintain the electrochemically active material in suspension within the organic solvent.

The preferred elastomeric binders are a styrene-butadiene copolymer manufactured under the trade name of AMERIPOL by the B.F. Goodrich Company or styrene-ethylene/butylene-styrene block copolymers manufactured under the trade name KRATON by the Shell Chemical Co. Suitable organic solvents useful as a carrier in formulating such organic slurries may include naphthol spirits, Stoddard solvent, decane, xylenes, iso-paraffins, and mixtures thereof. After extrusion onto the substrate, the organic slurry is dried to remove the organic solvent and to form a microporous, flexible coating on the substrate wherein particles of electrochemically active material are bound together and to the substrate by means of the elastomeric binder.

Alternatively, another preferred binding system employs an alcohol soluble polyamide, which imparts desirable cadmium agglomerating retardation characteristics to the electrode. This system is more fully described in copending application Ser. No. 382,816 filed Jul. 19, 1989 (such application is hereby incorporated by reference).

In accordance with the invention it has been found unexpectedly that the normal tendency of the nickel electrode to swell during recharging is retarded by ensuring that the electrically conductive substrate 15 of the counter pasted negative electrode 40 is substantially nonforaminous, e.g. imperforate. By "substantially nonforaminous" is meant that the substrate lacks macro holes, reticulation or perforations, and particularly that any micro holes or reticulation pattern present are so small, as "seen" by the positive electrode, that a uniform current density is applied to substantially the entire negative plate on charge and discharge. It has been found that foraminous negative plate substrates e.g. those having 2 mm diameter perforations spaced about 3–5.2 mm apart (center to center), induce the formation of blisters in a test nickel electrode in an accelerated flooded test cell in the exact pattern of the perforations of the negative counter electrode's substrate.

Preferably substrate 15 of the negative electrode of the invention is formed of a flat smooth conductive sheet completely free of holes or reticulation to the naked eye, although such imperforate sheet may be stippled, embossed, roughened, etched or otherwise modified to enhance adhesion to the paste of active material. However, micro holes or foramina having a cross dimension on the order of less than about 200, more preferably less than about 100, most preferably less than about 30 percent of the interelectrode distance (measured from the surface of the nickel electrode to the surface of the negative substrate) may be employed without significant deleterious effect.

Although not entirely understood, it is believed that perforated substrate negative electrodes of the prior art exhibit nonuniform current densities due to "edge effects" at each perforation. Accordingly, the corresponding area of the nickel electrode directly across from these perforations receives more charge during recharging and, therefore, forms more gamma nickel hydroxide which causes blistering (swelling) at those sites.

Applicants are unaware of any teaching or suggestion in the prior art that nickel electrode swelling can be retarded by using imperforate substrate in the counter electrode, of the pasted type. Imperforate grid in cadmium and other negative electrodes is known per se. See, for instance, U.S. Pat. No. 3,783,025 (King et al.); U.S. Pat. No. 4,460,666 (Dinkler et al.); and U.S. Pat. No. 4,686,013 (Pensabene et al.).

Positive electrode plate 30 is preferably formed by sintering a low density metal powder, for example, a carbonyl nickel powder, on each face of a porous substrate 34 which can be any suitable electrically conductive material, for example, nickel plated steel, which preferably has been perforated to provide the sinter with mechanical interconnection across the perforations. Conventionally, the electrode plaque thus formed, of about 80 percent porosity, is loaded by impregnating the plate in a series of steps with an aqueous solution containing an electrochemically active precursor nickel material preferably nickel nitrate which subsequently is precipitated out of solution thereby forming an area on each face of substrate 34 and within the perforations through the substrate which contains an electrochemically active material, namely nickel hydroxide. This standard sintered nickel electrode has exhibited the aforementioned swelling problem when matched with a negative electrode employing a perforated substrate.

Alternatively, positive electrode 30 may employ a higher porosity (e.g. 85-95 percent) substrate, plaque or mat, of metal foam, randomly intermingled metal fibers pasted or impregnated with active nickel material, or simply a perforated or nonperforated sheet substrate on which is pressed or pasted a dry powder, slurry or paste containing the active material. Additional components may be admixed with the active material such as conductive powders or fibers, binders, antipolar mass, cobalt and the like as is well known to those skilled in the art.

As thus manufactured, the electrode assembly 20 is inserted into and housed within container 12. To electrically connect positive electrode plate 30 to a portion of the container which is electrically insulated from sidewall 12, for example, contact button 17 of cover 13, an electrically conductive tab (not illustrated) is formed integrally with or welded to an end portion of substrate 19 which is not coated with active material, is dimensioned to extend beyond substrate 19, and is secured in known manner to the cover by any suitable means, such as laser welding.

In accordance with another aspect of the present invention, the exterior face 15' of substrate 15 of the outermost or peripheral layer or wrap of negative electrode plate 40 is exposed and contacts the sidewall 14 of container 12 to electrically connect the outermost or peripheral layer or wrap of electrode plate 40 directly to the side wall 14. To expose the exterior face of nonforaminous substrate 15' of the outermost or peripheral layer or wrap of electrode plate 40, outer layer of separator material 50, and the layer of active material 42 are removed from the outermost or peripheral layer or wrap of electrode plate 40. The outer layer of separator material is removed while winding the components of the electrode assembly of the present invention about a removable arbor. Prior to winding, the layer of active material 42 can be scarfed from the exterior of the outermost or peripheral layer or wrap of electrode plate 40 thereby exposing substrate 15' so that electrical contact will be made to substantially the entire peripheral surface of exposed substrate 15' and the sidewall 14 of container 12. This layer of active material 42 can be scarfed by scraping the exterior face of substrate 15' in the outer layer or wrap by suitable means, for example, a blade. Alternatively, electrode plate 40 is preferably formed such that the outer wrap or layer of substrate 15' does not have a layer of surface active material 32 formed on the exterior face thereof, as will be described hereinafter with respect to FIGS. 4 and 5. Outer wrap of substrate 34 is substantially imperforate and has a layer of surface active material 42' extruded only on the interior face thereof.

Figure 4:
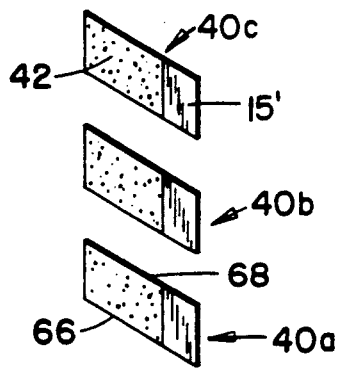
FIG. 4 is a schematic representation of an extrusion coating process for producing negative electrode plates in accordance with the invention.
Figure 5:
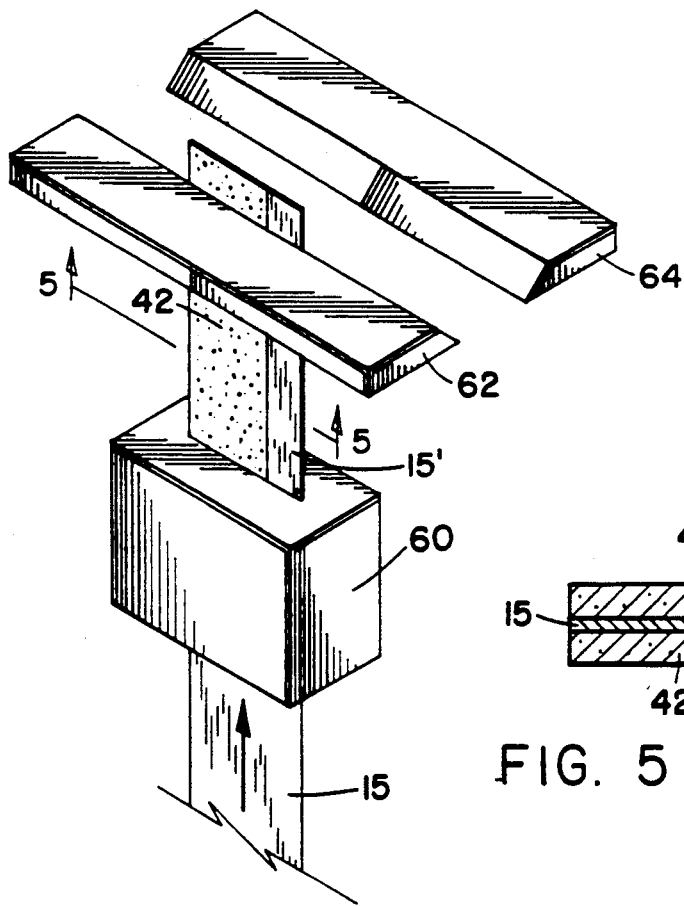
FIG. 5 is a sectional view of the pasted substrate strip of FIG. 4 taken along 5—5.
Figure 5:
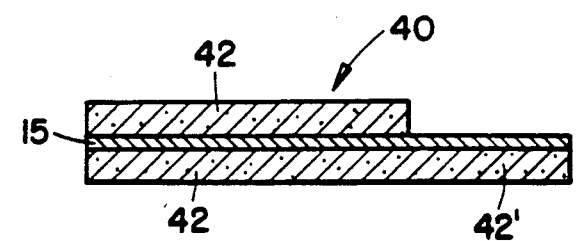

The preferred method of forming electrode plate 40, shown in cross section in FIG. 5 as produced, is by the crosshead extrusion coating process illustrated in FIG. 4. Accordingly, imperforate conductive strip substrate 15 is vertically upwardly advanced through an opening in a crosshead die 60, equipped with-an inlet (not shown) for continuously supplying negative active paste. The die opening is shaped to extrusion coat substrate 15 to the pasted configuration of FIG. 5; i.e. both opposed major faces of substrate 15 bear paste layers 42 in a first transverse portion 15 of the substrate, while in the adjoining transverse portion one face of portion 15' of the substrate is bare and the opposite face has adhered to it paste layer 42'. An alternative to extrusion coating includes fully pasting both sides of substrate 15 and employing a doctor blade to selectively remove paste from a portion of the substrate.

The thus pasted substrate is then advanced to knife means 62, 64 which cross cut the pasted substrate into electrodes 40a, 40b, 40c, etc. of desired width. Subsequently the plates are dried or heated to drive off the paste vehicle e.g. water or solvent.

Use of imperforate substrate in accordance with the invention also simplifies this manufacturing process since the transversely cut edges 66, 68 of each electrode are free of burrs or raw edges (as in the case of transversely cutting through perforations), which if present lead to shorting in finished cells (in this respect, reference is also made to col. 1, lines 26-65 of U.S. Pat. No. 4,105,832 (Sugalski)).

Figure 6:
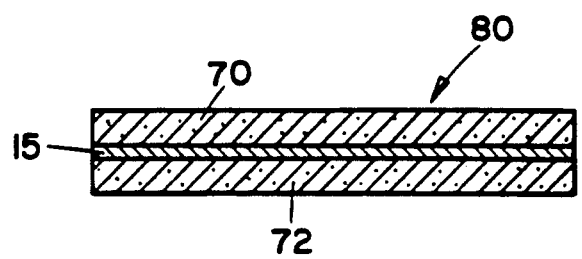
FIG. 6 is a cross-sectional view similar to FIG. 5 showing an alternative embodiment of a negative electrode plate made in accordance with the invention.

Alternatively nonforaminous substrate 15 can be pasted only on one side thereof, or on both sides with paste layers 70 and 72 to form electrode 80, as shown in FIG. 6. Electrodes made in either of these fashions are especially suited for use in parallel plate cells (prismatic), the former embodiment allowing conductive contact to be made with the inside wall of a flat walled conductive container.

Figure 2:
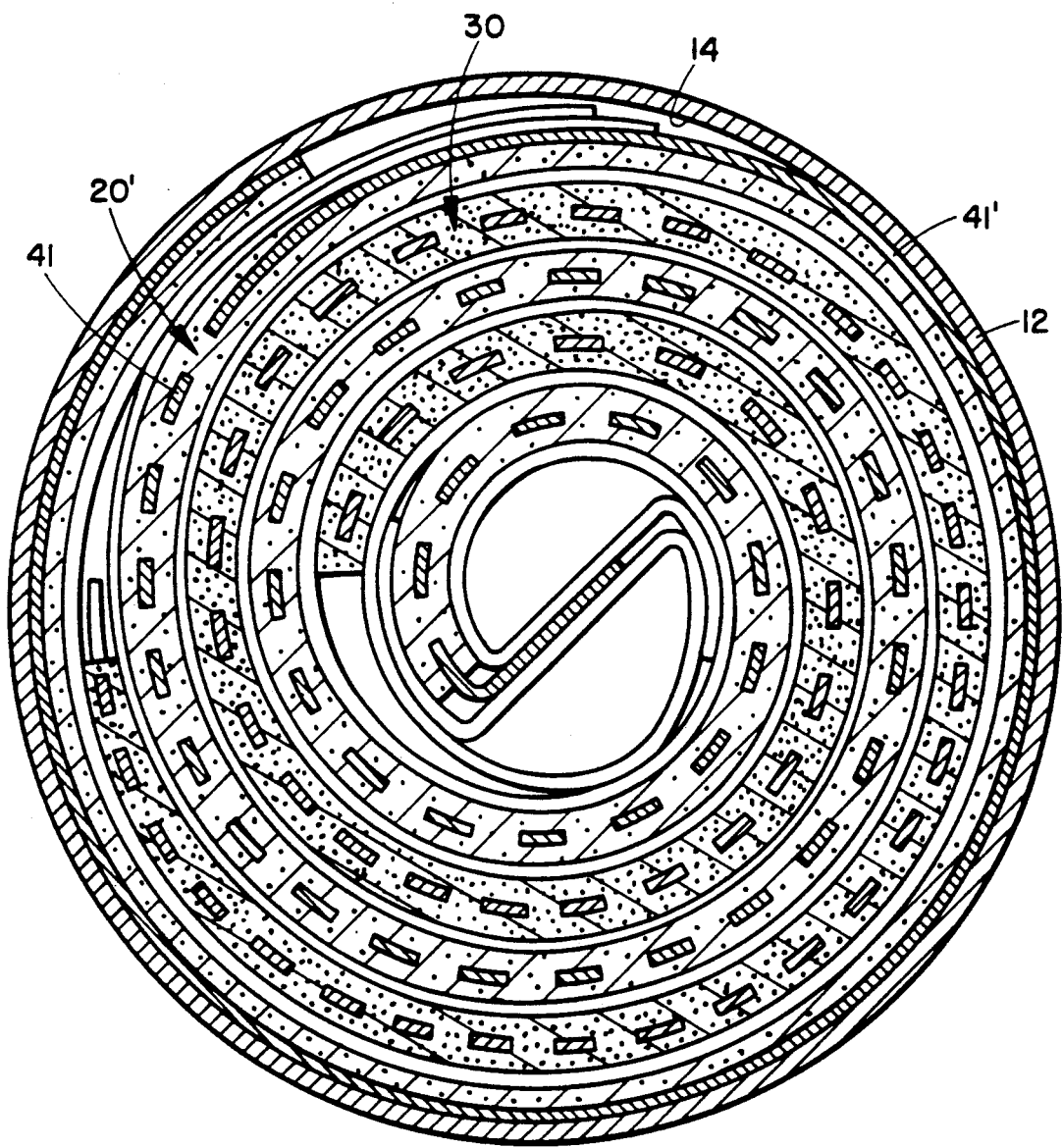
FIG. 2 is a cross-sectional view of another embodiment of a wound electrode assembly of the present invention as installed within a container of a sealed nickel electrode-containing electrochemical device.

In the alternative, less preferred embodiment of FIG. 2, only the outer wrap portion 41' of substrate 41 of negative plate 20' is imperforate, to make a good electrical connection to inner wall 14 of container 12. The greater the proportion of substrate 41 which is nonforaminous (and imperforate) the greater the swelling inhibition imparted to the juxtoposed nickel electrode 30 during cycling (repeated charge and recharge).

Figure 3:
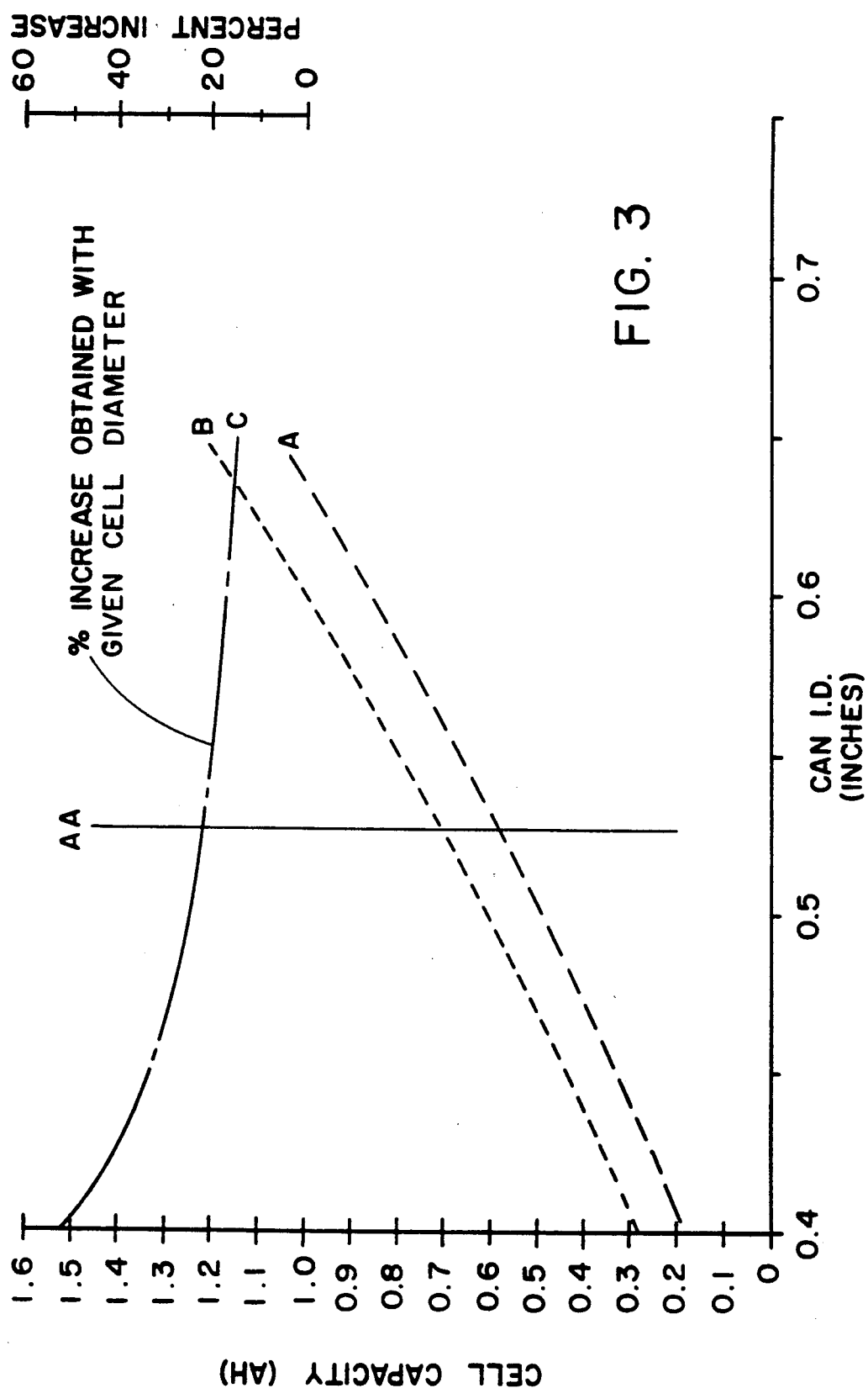
FIG. 3 is a graphical illustration of the increased electrochemical cell capacity obtained with the wound electrode assembly of the present invention for a sealed nickel-cadmium cell.

The electrode assembly of FIGS. 1 and 2 of the present invention, and analogous arrangements in other cell configurations such as prismatic, result in improved contact between the negative electrode plate and the container of an electrochemical cell. In addition the volume normally occupied by separator and active material on the outside surface of the outer wrap of conventional wound electrode assemblies now becomes available for introducing additional positive and/or negative electrode active material in the same volume. The amount of additional electrochemically active material and the attendant increase in electrical capacity of a given electrochemical cell are a function of the thickness of each component of the electrode assembly of the present invention and the diameter or cross dimension of the container into which the assembly is positioned. FIG. 3 is a graphical illustration of the increase in cell capacity obtained with a wound electrode assembly of the present invention for a nickel-cadmium cell. Calculations were base on a positive plate thickness of 0.030 inch and a width of 1.575 inches, a negative plate thickness of 0.021 inch, separator thickness of 0.006 inch, and an arbor diameter of 0.187 inch. Curve A of FIG. 3 represents the electrical capacity of a conventionally manufactured nickel-cadmium cell, curve B represents the electrical capacity of a nickel-cadmium cell utilizing the wound electrode assembly of the present invention, and curve C represents the percentage of increase of cell capacity obtained in utilizing the wound electrode assembly of the present invention. The increase in cell capacity utilizing the wound electrode assembly of the present invention is greater for smaller diameter cells. As illustrated, the increase in cell capacity for a AA sized cell is greater than 20%.

The following examples describe the manner and process of making and using the present invention and set forth the best mode contemplated by the inventor of carrying out the invention but are not to be construed as limiting the scope thereof.

EXAMPLE 1

Several cylindrical, sealed nickel cadmium AA size cells were each wound in accordance with the present invention on a 0.187 inch arbor from a conventionally sintered positive electrode plate impregnated with nickel hydroxide and an extrusion coated elastomer bonded cadmium oxide negative electrode plate. The positive and negative electrode plates were interposed with a non-woven nylon separator. The negative electrode plate was formed such that the exterior surface of the outer layer or wrap thereof was substantially free of elastomer bonded cadmium oxide and the outer layer of separator was sized so that the substrate of the outer layer or wrap, which was formed of smooth imperforate nickel coated steel sheet 0.059 mm thick, was exposed. The resultant wound electrode assembly was positioned within a cylindrical cell container such that the exposed substrate of the outer layer or wrap of negative electrode plate contacted the container side wall. Prior to sealing the cells, 1.95 milliliters of 27 weight percent KOH was added thereto. The cells were then sealed and formed at 70 milliamperes for 24 hours and discharged at 700 milliamperes. Cell capacities for these cells are summarized below in Table 1.

EXAMPLE 2

A high energy density positive electrode plate was manufactured by filling a high porosity nickel foam structure with a slurry of nickel hydroxide and other active materials and drying and compressing the electrode plate to a thickness set forth in Table 1. The resultant positive electrode plate was employed with the components of and wound, activated, and formed in accordance with Example 1 to form a plurality of cells. Cell capacities for such cells are summarized below in Table 1.

EXAMPLE 3

A plurality of cells were constructed, activated and formed in accordance with Example 2 except that cadmium oxide and separator were present on the exterior of the substrate of the outer layer or wrap of the negative electrode plate in accordance with conventional practice. The negative electrode plate had a nickel tab attached to edge of the plate which was welded to the bottom of the cell container.

The results of Examples 1, 2, and 3 are summarized below in Table 1. Cell capacities are set forth both as a value which is typical of the measured values and as a value rated on a "C" rate scale, i.e., a one hour rate.

As evident from the results set forth above, the length of separator necessary to construct the electrode assemblies of Examples 1 and 2 in accordance with the present invention was substantially less than that necessary to construct the conventional cells of Example 3. This resulted in a significant increase in the length of both the positive and negative electrode plates in the wound electrode assemblies and in the capacities of the cells employing such electrode assemblies according to the invention.

Examples 4 and 5, set forth below, compare the swelling tendencies of sintered nickel electrodes in flooded test cells against control cadmium electrodes employing perforated substrates (Example 4), and the same electrodes employing imperforate substrates according to the invention (Example 5).

TABLE 1

|  | POSITIVE | | | NEGATIVE | | | SEPARATOR | | | CAPACITY | |
| --- | --- | --- | --- | --- | --- | --- | --- | --- | --- | --- | --- |
|  | Thickness | Length | Width | Thickness | Length | Width | Thickness | Length | Width | Typical | Rating |
| EXAMPLE 1 | 0.030 in. | 2.48 in. | 1.575 in. | 0.021 in. | 3.92 in. | 1.575 in. | 0.006 in. | 9.03 in. | 1.78 in. | 720 mAhr | 600 mAhr |
| EXAMPLE 2 | 0.030 in. | 2.48 in. | 1.575 in. | 0.021 in. | 3.92 in. | 1.575 in. | 0.006 in. | 9.03 in. | 1.78 in. | 821 mAhr | 700 mAhr |
| EXAMPLE 3 | 0.030 in. | 1.94 in. | 1.575 in. | 0.021 in. | 3.38 in. | 1.575 in. | 0.006 in. | 10.20 in. | 1.78 in. | 638 mAhr | 550 mAhr |

EXAMPLE 4

A test cell was constructed by providing a rectangular flat nickel test electrode, wrapping this electrode in standard nylon separator, sandwiching the test nickel plate and separator between a pair of rectangular cadmium counter electrodes, followed by wrapping the thus formed sandwich in additional separator, and providing a polyvinyl chloride film backing-on the outside of the outer most separator layer faces. The test cells were then held in compression by two small paper binder clips, and the thus formed test cells were placed in plastic rectangular open containers which were filled with 31 weight percent potassium hydroxide to just above the top of the test cell, and appropriate electrical connections made to allow discharge and charge of the test cell.

The particular specifications of the test cell were as follows. The positive test plate electrode was a standard sintered nickel electrode. The overall dimensions of the test electrode were 3.2 cm long by 3.1 cm wide by 0.731 mm thick. The test plate employed a perforated nickel plated steel substrate having a thickness 0.0635 mm and perforations whose hole inside diameter was 1.1 mm. A standard sintered nickel matrix having a bulk density of 0.083 $g/cm^2$ was present on both major faces of the substrate. The porous sintered nickel was impregnated with electrochemically active nickel hydroxide at a loading level of 0.1588 $g/cm^2$.

The pair of negative counter electrodes were identical pasted cadmium electrodes employing perforated nickel plated steel substrates having a thickness of 0.059 mm, hole internal diameters of 2 mm and a hole pattern present such that 12 holes were contained per $cm^2$ of substrate area. The cadmium paste composition was of the type disclosed in the aforementioned copending U.S. patent application Ser. No. 382,816. The dry weights of the ingredients in percent by weight were: 91.1 percent cadmium oxide; 5 percent cadmium metal particles; 1.12 percent nickel hydroxide; 1.25 percent zirconium oxide; 1 percent polyamide binder/anti-agglomerant (Henkel 6200); and 0.5 percent polyethylene fiber. The active material weight was 0.1 $g/cm^2$. The outside dimensions of the pasted cadmium counter electrode were 3.2 cm long by 3.2 cm wide by 0.55 mm thick.

Separator layers were formed of nonwoven mats of 67 percent nylon 66 and 33 percent nylon 6. The separator layers had a length of 10 cm, a width of 5 cm and weight of 70 $g/m^2$ and a thickness such that the interelectrode spacing in the test cell was 0.17 mm.

The electrolyte utilized was 31 weight percent potassium hydroxide.

The test cell was cycled by discharging at a current of 0.055 amperes for one hour, followed by charging at a current of 0.055 amperes for 19.87 hours. Upon conclusion of this discharge/charge regime, the test plates were removed from the cell holder container and washed to remove the potassium hydroxide. The thickness of the test plate was then promptly measured in the wet state and found to be 0.909 mm. This represented a 24.3 percent increase in thickness compared to the original thickness of 0.731 mm.

EXAMPLE 5

The same test cell apparatus and components were used as in Example 4 which measured thickness increase of the test electrode matched with the control negative counter electrodes employing perforated substrate. The sole exception is that in this example the cadmium electrode substrate was imperforate, without any holes. The only other difference was a slight difference in measured thickness of the positive test plate. In this example the measured thickness was 0.732 mm. Upon conclusion of the test performed identically as described in Example 4, the nickel test electrode was removed from the test cell and was to remove potassium hydroxide, and the wet thickness of the electrode measured in the same manner as in Example 4. It was found that the nickel test electrode had increased in thickness from the initial 0.732 mm to a final wet thickness of 0.768 mm. This represented an increase in thickness of only 4.9 percent, compared to the control perforated electrode of Example 4 which had undergone swelling of 24.3 percent.

While the preferred embodiments have been fully described and depicted for the purpose of explaining the principles of the present invention, it will be appreciated by those skilled in the art that various modifications and changes may be made thereto without departing from the scope of the invention set forth in the appended claims.

What is claimed is:

1. A method for preparing a negative electrode plate for use in a rechargeable nickel electrode-containing electrochemical cell comprising the steps of:

advancing an electrically conductive strip substrate at least a portion of which is nonforaminous into and through a coating means;

preferentially applying a paste mixture of electrochemically active material and a vehicle onto the advancing strip such that both opposed major faces of the strip bear paste along a first transverse portion of the strip, and only one of such major faces bears paste along a second transverse portion of the strip leaving a bare substrate portion;

transversely severing the thus pasted strip into a plurality of component strips suitable as electrodes, the bare substrate portion of each component strip adapted to make electrical contact to a terminal of the electrochemical cell; and removing vehicle from the component strip.

2. The method of claim 1 wherein said bare substrate portion is nonforaminous.

3. The method of claim 1 wherein the strip substrate is an imperforate metallic sheet.

* * * * *

UNITED STATES PATENT AND TRADEMARK OFFICE
CERTIFICATE OF CORRECTION

PATENT NO. : 5,141,523

DATED : Aug. 25, 1992

INVENTOR(S) : Arthur J. Catotti; Saverio F. Pensabene; Douglas B. Frye; Vincent J. Puglisi It is certified that error appears in the above-identified patent and that said Letters Patent is hereby corrected as shown below:

Please substitute the following on the cover page of the patent:

[75] Inventors: Arthur J. Catotti of Gainesville, Fla.

Signed and Sealed this

Twenty-fifth Day of January, 1994

Attest:

BRUCE LEHMAN

Attesting Officer     Commissioner of Patents and Trademarks